US009591370B2

(12) United States Patent
Phadnis

(10) Patent No.: US 9,591,370 B2
(45) Date of Patent: *Mar. 7, 2017

(54) METHOD AND SYSTEM FOR TELEVISION CONSUMPTION

(71) Applicant: What's On India Media Private Limited, Lower Parel, Mumbai (IN)

(72) Inventor: Atul Phadnis, Mumbai (IN)

(73) Assignee: What's On India Media Private Limited, Mumbai (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/189,688

(22) Filed: Jun. 22, 2016

(65) Prior Publication Data
US 2016/0301979 A1 Oct. 13, 2016

Related U.S. Application Data

(63) Continuation of application No. 14/915,508, filed as application No. PCT/IN2014/000577 on Sep. 2, 2014.

(30) Foreign Application Priority Data

Sep. 2, 2013 (IN) .......................... 2855MUM2013

(51) Int. Cl.
| | |
|---|---|
| H04N 5/445 | (2011.01) |
| G06F 3/00 | (2006.01) |
| G06F 13/00 | (2006.01) |
| H04N 21/482 | (2011.01) |
| G06Q 30/06 | (2012.01) |
| H04N 21/2543 | (2011.01) |

(Continued)

(52) U.S. Cl.
CPC ......... *H04N 21/4826* (2013.01); *G06Q 30/06* (2013.01); *H04N 21/251* (2013.01); *H04N 21/2543* (2013.01); *H04N 21/25891* (2013.01); *H04N 21/2665* (2013.01); *H04N 21/4667* (2013.01); *H04N 21/4668* (2013.01); *H04N 21/47815* (2013.01); *H04N 21/8549* (2013.01)

(58) Field of Classification Search
USPC .......................................... 725/5, 37, 46, 48
See application file for complete search history.

(56) References Cited

U.S. PATENT DOCUMENTS

| | | | |
|---|---|---|---|
| 5,694,176 A | 12/1997 | Bruette et al. | |
| 6,314,573 B1 * | 11/2001 | Gordon | H04N 7/17318 |
| | | | 348/E7.071 |

(Continued)

OTHER PUBLICATIONS

The International Search Report (ISR) with Written Opinion for PCT/IN2014/000577 mailed Mar. 30, 2016.

(Continued)

*Primary Examiner* — Kunal Langhnoja
(74) *Attorney, Agent, or Firm* — McDonnell Boehnen Hulbert & Berghoff LLP

(57) ABSTRACT

A method and system for management of day-to-day television consumption is disclosed. More particularly, the disclosure relates to the evaluation and comparison of television providers and television channel packages, as well as management of the programs/channel packs offered by the television providers. The system and method disclosed herein enables the consumer to view and compare television channel offers, construct television channel packages, and purchase the constructed packages.

17 Claims, 22 Drawing Sheets

(51) Int. Cl.
*H04N 21/478* (2011.01)
*H04N 21/25* (2011.01)
*H04N 21/258* (2011.01)
*H04N 21/2665* (2011.01)
*H04N 21/466* (2011.01)
*H04N 21/8549* (2011.01)

(56) References Cited

U.S. PATENT DOCUMENTS

| | | |
|---|---|---|
| 6,904,610 B1 | 6/2005 | Bayrakeri et al. |
| 7,596,797 B1* | 9/2009 | Kapner, III ........ H04N 5/44543 |
| | | 725/44 |
| 9,392,314 B1* | 7/2016 | Lewis ................ H04N 21/2668 |
| 2002/0019981 A1 | 2/2002 | Schein et al. |
| 2002/0199193 A1 | 12/2002 | Gogoi et al. |
| 2003/0005446 A1* | 1/2003 | Jaff .................... H04N 7/17318 |
| | | 725/51 |
| 2003/0145326 A1* | 7/2003 | Gutta ................ H04N 5/44543 |
| | | 725/46 |
| 2006/0212904 A1 | 9/2006 | Klarfeld et al. |
| 2006/0271958 A1 | 11/2006 | Ukai et al. |
| 2007/0083895 A1* | 4/2007 | McCarthy .......... H04N 5/44543 |
| | | 725/46 |
| 2008/0184302 A1* | 7/2008 | Knudson ............ H04N 5/44543 |
| | | 725/40 |
| 2010/0175092 A1* | 7/2010 | Kikinis .................. H04N 7/163 |
| | | 725/61 |
| 2010/0192180 A1 | 7/2010 | Olague et al. |
| 2011/0321072 A1* | 12/2011 | Patterson ......... H04N 21/44222 |
| | | 725/5 |
| 2015/0161644 A1* | 6/2015 | Bamane ............. G06Q 30/0226 |
| | | 705/14.27 |

OTHER PUBLICATIONS

Non-final Office Action dated Nov. 14, 2016 of U.S. Appl. No. 14/915,508, filed Feb. 29, 2016.

* cited by examiner

METHOD AND SYSTEM FOR TELEVISION CONSUMPTION

CROSS REFERENCES TO RELATED DISCLOSURES

The present disclosure is a continuation of U.S. patent application Ser. No. 14/915,508 filed Feb. 29, 2016, which is a national stage entry of PCT/IN2014/000577, filed Sep. 2, 2014, and claims priority to IN 2855/MUM/2013, filed Sep. 2, 2013. The full disclosures of PCT/IN2014/000577 and IN 2855/MUM/2013 are incorporated herein by reference.

BACKGROUND

A. Technical Field

The present disclosure relates to a method and system for management of day-to-day television consumption, more particularly the disclosure relates to seamless evaluation and comparison of operators and channel packages and management of the programs/channel packs offered by the operators.

B. Background Art

The competition in the TV programming industry has resulted in a general improvement in the service in the entire industry. However, the TV industry is a two-sided market where both advertisers and viewers buy access to the programs offered by competing TV channels. Under the current market structure advertising prices are typically set by TV channels while viewer prices are set by distributors (e.g. cable operators). The latter implies that the distributors partly internalize the competition between the TV channels, since they take into account the fact that a lower viewer price at one channel will harm rival channels. We nonetheless find that a shift to a market structure where both advertising prices and viewer prices are set competitively by the TV channels might increase joint industry profits. The reason is that this market structure, in contrast to the one we observe today, directly addresses the two-sidedness of the market. This leads to the non-uniform charges patterns for the same channels across the varied service providers. One service provider may become the all time leader in sports programming and the other may dominate in movie programming with more movie channels than any other programming service provider has carried in the history of TV programming. One cannot easily understand and imagine what the service providers of the TV programming industry have in store for the viewing public as the future unfolds.

With increased competition in this space, number of features, HD channels, interactivity and better services are now a given.

However, the packages are not clearly defined and have more chance of confusion as it does not clearly disclose the channels included, i.e. the channels of each genre—news, sports, infotainment, music, lifestyle, movies and general entertainment and their respective costs. This opaque bundle channel structure of each service provider makes it difficult for the viewer to choose appropriate service provider/channel operator or the channels packs offered by them. The complexity per operator in terms of the number of packs, add on packs, a-la-carte channels, value added services as well as PPV and VOD content makes it a daunting task for the user/consumer. The compounding effect of all these factors will typically turn into a multitude of permutations and combinations resulting in consumer confusion and chaos.

There is no simple way for a consumer to determine which is better for him/her—many of the options offer similar services and performance. However, the consumer may choose between operators on the basis of entry price point, various channel packages, monthly costs, multi-room discounts and HD services.

The operators may try to entice consumers by advertising a large number of available channels. However it is important for the consumer to know that which channels are free (or included in the basic package) and how often does the operator add new channels, how many regional channels are included in the advertised number, how many HD and interactive channels are available in the mix. This information is not clearly made available to consumer by the operator. Hence it becomes difficult for the consumer to choose the channel pack or operator as the total number of channels on offer matters little if the channels the consumer really wants to watch are not available. It is important for the consumer to know which package offers the channels that are relevant for the consumer, how much extra will the consumer have to pay for specialized packages, how easily and how often can consumer switch between plans, if a new channel is added, will it automatically get added to consumers existing package etc.

Hence, there is a need for a common platform that enables the consumer to view and compare offers, buy new connections, buy/upgrade packs/channels, recharge account, compare and view pack comparisons, compare and view channel comparisons, construct packs, register and track complaints. Further, the common platform also shall be capable of providing functional facilities to operators and broadcasters.

For the reasons stated above, which will become apparent to those skilled in the art upon reading and understanding the specification, there is a need in the art for a system and method for operator, channel packs selection and management for offering better future viewership to a consumer that is useable, scalable and independent of new technology platforms, uses minimum resources that is easy and cost effectively maintained and is portable and can be deployed anywhere in very little time.

SUMMARY

A method and system for management of day-to-day television consumption is disclosed. More particularly, the disclosure relates to seamless evaluation and comparison of operators and channel packages and management of the programs/channel packs offered by the operators. The system and method thereof disclosed herein enables the consumer to view and compare offers, buy new connection, buy/upgrade packs/channels in the pack, recharge account, view pack/channel comparison, construct packs, register and track complaints etc. Included in the system 100 are a plurality of user terminals 102, at least one server 104 connected to the plurality of user terminals 102, at least one cloud computing platform 106 connecting at least one server 104 over at least one network and a Television Consumption (TC) system 108 connected to the cloud computing platform 106. The TC device 108 includes a user management system module (UMSM) 112, at least one database module (DM) 114, at least one recommendation module (RM) 116, at least one comparator module (CPM) 118, at least one derivative and output module (DOM) 120, at least one Pack constructor and optimizer module (PCOM) 122, at least one operator subscriber management system module (OSMSM) 124, at least one data acquisition module (DAM) 126, at least one payment and billing module (PBM) 128, a call centre operation support module (CCOSM) 130 and an outbound communication module (OCM) 132, at least one third party advertisers and advertise engine module (TPAAEM) 134, a complaint processing module (CTPM) 136, a system process control module (SPCM) 138 and a communication module (CM) 140. The system 100, when operated in accordance with an example method, enables a consumer to perform Quick Recharge, where the consumer may be able to recharge their user accounts with DTH/cable operator/service providers and all other advanced platform of media distribution with minimum efforts.

DETAILED DESCRIPTION

Figure 1:
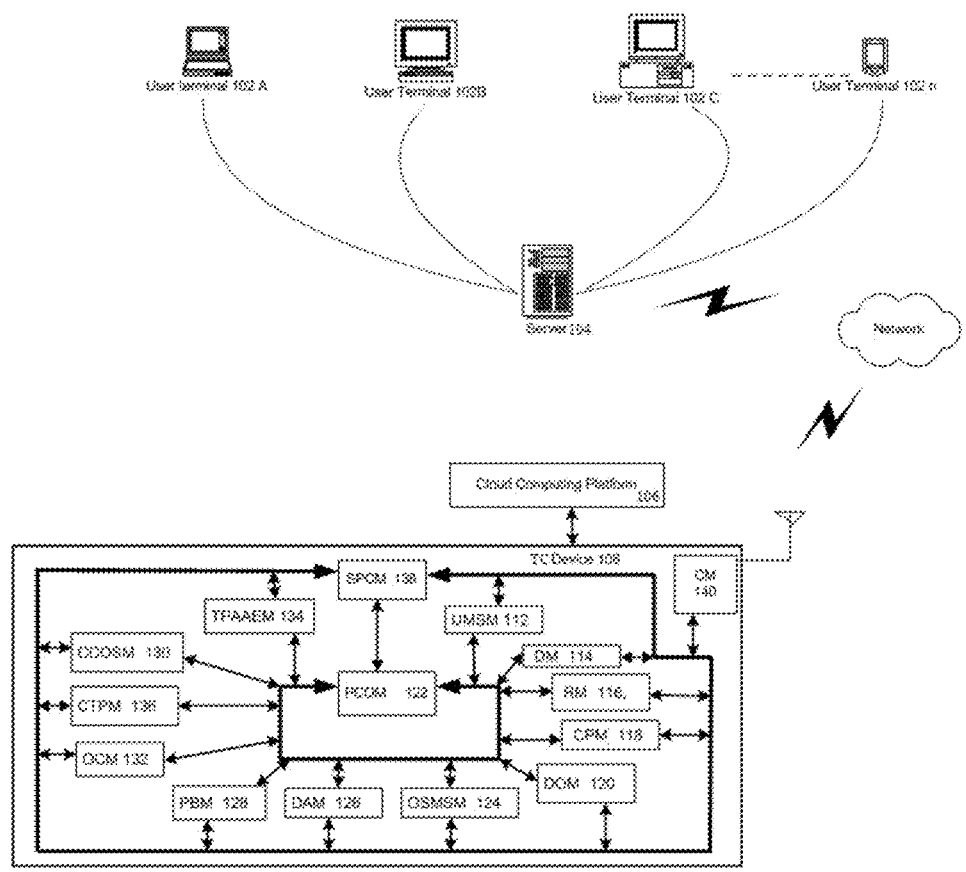
FIG. 1 is an example of a system in accordance with at least one embodiment.
Figure 2:
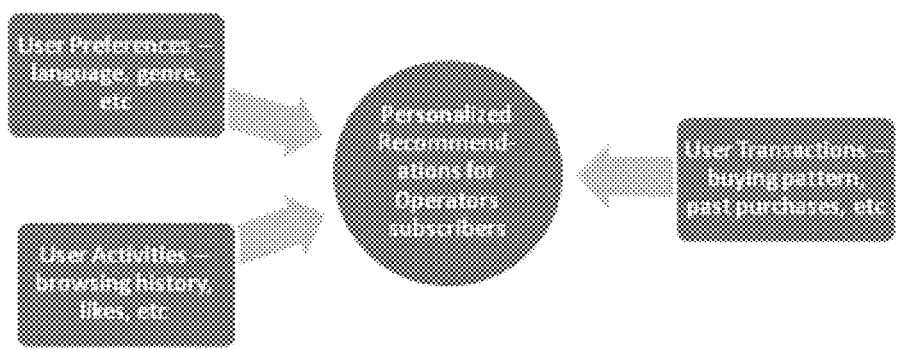
FIG. 2 is an example recommendation engine.

The embodiments herein provide a method and system for management of day-to-day television consumption. Further the embodiments may be easily implemented in various channel packs management structures. Embodiments may also be implemented as one or more applications performed by stand alone or embedded systems.

The systems and methods described herein are explained using examples with specific details for better understanding. However, the disclosed embodiments can be worked on by a person skilled in the art without the use of these specific details.

Throughout this application, with respect to all reasonable derivatives of such terms, and unless otherwise specified (and/or unless the particular context clearly dictates otherwise), each usage of:

"a" or "an" is meant to read as "at least one."

"the" is meant to be read as "the at least one."

References in the specification to "one embodiment" or "an embodiment" means that a particular feature, structure, characteristic, or function described in connection with the embodiment is included in at least one embodiment. The appearances of the phrase "in one embodiment" in various places in the specification are not necessarily all referring to the same embodiment.

Hereinafter, embodiments will be described in detail. For clarity of the description, known constructions and functions will be omitted.

Parts of the description may be presented in terms of operations performed by a computer system, using terms such as data, state, link, fault, packet, and the like, consistent with the manner commonly employed by those skilled in the art to convey the substance of their work to others skilled in the art. As is well understood by those skilled in the art, these quantities take the form of data stored/transferred in the form of non-transitory, computer-readable electrical, magnetic, or optical signals capable of being stored, transferred, combined, and otherwise manipulated through mechanical and electrical components of the computer system; and the term computer system includes general purpose as well as special purpose data processing machines, switches, and the like, that are standalone, adjunct or embedded. For instance, some embodiments may be implemented by a processing system that executes program instructions so as to cause the processing system to perform operations involved in one or more of the methods described herein. The program instructions may be computer-readable code, such as compiled or non-compiled program logic and/or machine code, stored in a data storage that takes the form of a non-transitory computer-readable medium, such as a magnetic, optical, and/or flash data storage medium. Moreover, such processing system and/or data storage may be implemented using a single computer system or may be distributed across multiple computer systems (e.g., servers) that are communicatively linked through a network to allow the computer systems to operate in a coordinated manner.

According to an embodiment, the method and system for management of day-to-day television consumption is in accordance to the users choices, preference and to the benefit across multiple platforms.

According to an embodiment, the system and method may assist consumers with their day-to-day television consumption.

According to an embodiment, the system and method enable users to buy new TV connection, switch channel packs, buy channels and recharge their accounts via internet and mobile.

According to an embodiment, consumers are able to seamlessly evaluate and compare all the DTH/IPTV/Cable operators/service providers and all other advanced platform of media distribution and their channel packs available in the market. Users can also evaluate channels and individually create customized channel packs to suit their needs.

According to an embodiment, the system and method thereof enable a consumer to perform Quick Recharge, where the consumer may be able to recharge their user accounts with DTH/cable operator/service providers and all other advanced platform of media distribution with minimum efforts.

According to an embodiment, the system and method thereof present unbiased details to the consumer for comparison and acts as a one-stop-shop for TV related transactions.

According to an embodiment, the system and method thereof enable a consumer to perform search, provide recommendations based on user profile, enable the consumer to personalize the packs through Personalization engines and provide an electronic program guide (EPG) through Cloud computing platform.

According to an embodiment, the system and method thereof enables the consumer to view and compare offers, buy new connection, buy/upgrade packs/channels in the pack, recharge account, view pack/channel comparison, construct packs, register and track complaints etc.

As per one of the embodiment, the system and method enables the operator to construct new packs, study pack consumption patterns, study channel consumption pattern, to perform complaint logging and tracking through widget system and to schedule grid.

Turning now to FIG. 1, an example system is provided and is generally designated 100. Included in the system 100 are a plurality of user terminals 102, at least one server 104 connected to the plurality of user terminals 102, at least one cloud computing platform 106 connecting at least one server 104 over at least one network and a TC system 108 connected to the cloud computing platform 106. The TC device 108 includes a user management system module 112, at least one database module 114, at least one recommendation module 116, at least one comparator module 118, at least one derivative and output module 120, at least one Pack constructor and optimizer module 122, at least one operator subscriber management system module 124, at least one data acquisition module 126, at least one payment and billing module 128, a call centre operation support module 130 and an outbound communication module 132, at least one third party advertisers and advertise engine module 134, a complaint processing module 136, a system process control module 138 and a communication module 140.

In an embodiment, the system process control module 138 is a processor configured to initialize, execute and synchronize the desired operations.

As per another embodiment, the system process control module 138, is a processor configured to initiate and synchronize execution of various modules. The executed modules may include, for example, a system configured for creation and configuration of user defined pack of channels and programs wherein the user is allowed to perform quick recharge, to personalize the pack, view and compare offers, buy new connection, buy/upgrade packs/channels in the packs, view pack channel comparison, construct packs, register and track complaints etc.

In some embodiments, the User Management System module 112 is a controller configured to provide a User dashboard that is specially designed to fulfil users need to cater to all his TV related needs. It is a dual purpose smart access point for both account details and TV preferences. It will have a snapshot of info and will give access to users account details, favourites, customized TV schedules, search feature, recharge feature, pack builder, etc. The user management system 112 lets users carry out several activities such as setting preferences, browsing channels and programs, setting favourites, setting reminders, discussions, interacting with friends via social media, etc. These are captured by the system for enhancing user experience and constructing useful user insights. The user management module 112 is capable of setting up a few questions to the user. Based on the answers to these questions, the system will automatically gauge the best suited pack for the particular user and suggest that pack to him.

User activities are used to derive user preferences for language, genre, sun-genre, etc. Apart from these user activities, additional user information like geography, time of TV viewing, family size, viewing habits, etc are also used along with operator's objectives to display accurate data and recommendations to the users to increase consumption by user. Subscription info pertaining to an individual user is derived from Operator SMS system which includes subscribed channel & packs, transaction history, payment history which helps determine the user's subscription details and buying patterns.

In some embodiments, the database module 114 consist of electronic program guide (EPG) database and Preview database, User database, analytics database, transaction database, complaint redress database, Pack and line up management (PLM) database. The EPG database is configured to store data indicating programming schedules for available content sources, such as TV schedules for all available channels. The EPG database may include channel details like name, logo, description, etc. and programme details like name, genre, synopsis, image, airing time, etc. The Preview database hosts a gallery of trailer and promo videos, which are sourced from the content owners (Broadcasters). This video gallery enables users to preview the channels and programmes before selecting particular content for viewing and/or deciding to purchase particular content. The PLM database is configured to store data regarding service offerings from each operator. For example, the stored data may include details like name of pack, price, schemes and offers, type of set-top-boxes used etc. associated with each new connection, packs and channels that the operator offers to his customers. Operators own their pack and offer information which gets updated very regularly (e.g., periodically and/or in response to an action taken by a given operator, such as in connection with an update request submitted by an operator). The details related to available service offerings are the base for this portal and these have to be updated constantly based on any changes from operators side.

In some embodiments, the recommendation module 116 is a processor configured to make personalized recommendations to the users based on three major inputs from the users. It takes into consideration the user profiling which includes users TV preferences and activities. On the other hand a recommendation engine of the recommendation module 116 tracks user's transaction history from the Operators subscribers management system. With these key inputs, the recommendation engine makes intelligent personalized recommendation to each user. Based on the users TV preferences and activities on the portal like channel and programme favourite, etc; the recommendation engine produce personalized recommendations for each user. These recommendations help up-sell (higher value packs) and cross-sell (additional packs/channels). The system intelligently gives personalized channel recommendations to the users via the back-end process algorithms. These recommendations bring the particular channel to the users notice and evoke them to explore the channel and finally subscribe to it. These recommendations are of channels which the user is not subscribed to. This leads the users to make transactions and subsequently increase A-la-carte channel sale for the operators. The recommendation module 116 can track the user activities and preferences; based on these, the system will use the back-end process algorithms and figure out the preferred channels for the user. For example, the system may identify particular content offerings which are rated favourably by and/or subscribed to by other subscribers that have one or more viewing attributes, preferences, etc. in common with a particular user. In some cases, the system may identify patterns of viewing attributes and/or preferences, for the particular user, which correlate with viewing attributes and/or preferences of a select group of other subscribers, and determine content to recommend to the particular user based on content rated favourably and/or subscribed to by subscribers in the correlated group, but which are not already subscribed to by the particular user. The system will check for these channels within the packs offered by the operator. And based on the pack compositions, the system will recommend a pack which is the best match with the user's requirements. The channels which are not subscribed by the user can be brought to his notice by very specific targeted recommendations. These channel recommendations can be sliced into various sub-sections like:

A. Channels recently launched in your favourite genre
B. Channels similar to your favourite channels
C. Channels favourite by you but not in your pack
D. Channels which have your favourite programs In some embodiments, the comparator module 118 is a controller configured to perform a comparison of a plurality of channel packs and a plurality of channels offered by a plurality of operators. The comparator module 118 may provide a comparison table, where the user can see the number of his favourite channels within each available pack. The comparison table may also display a number of fans for each channel. This helps the user compare the available packs and/or channels as per his likings.

In some embodiments, the Derivatives and Outputs module 120 draws several derivatives and outputs taking into account several parameters. These include top shows, channel stats, etc. All these help the user take an informed decision. Based on the EPG data, the module 120 may derive various channel statistics which can help guide a users decision while selecting and/or purchasing packs and/or channels. The module may also provide at least one conclusion drawn by the module 120 based on the schedules of the channels and the trends of the same.

In some embodiments, the Pack constructor and optimizer module 122 is a processor configured to enable a user to build a custom pack for him. The module 122 may be a unique component of the system 100. The user can add individual channel from the a-la-carte list and create a custom pack, based on the individual channel prices. Additionally the system aids this channel selection by making use of users favourite channels, language and genre preference, etc. The tool is dynamic and keeps displaying the total price for the custom pack; the price will also change with every addition or deletion. Once the user has selected the individual channels from the a-la-carte list, another system starts optimizing these channel requirements. Using the back-end algorithms the system compares the required channels to the pre-defined packs and its channel composition. Taking price as a base, the module 122 will optimize the output results and will suggest the best buy to the user. These suggestions could be packs or combination of packs and channels. The pack optimizer will ensure that the user gets all the channels he needs at the lowest cost possible.

In some embodiments, the operators Subscriber Management System module 124 is a data processor configured to store all the subscriber account details like subscribed pack, account balance and validity, etc. These have to be accessed in real time to be able to display personal account details to the subscribers. Also in case of a transaction the service needs to be activated on the subscribers (end user) account via the "SMS".

In some embodiments, the data acquisition system 126 is configured to acquire data dynamically from the plurality of operators plurality of resources and update and upgrade the plurality of databases of the system.

As per one of the embodiment, the system 100 and method thereof embed pack/channel buy widget, recharge account widget and consumer upselling and communication system.

As per one of the embodiment, the system 100 and method enables the administrator to upload pack information.

As per one of the embodiment, the system 100 and method thereof enable the broadcasters to perform pack analysis with placement data.

As per one of the embodiment, the system 100 and method thereof enable the broadcasters to determine subscribers per pack/channel.

In an embodiment, the system 100 is configured to provide user interface through application program interface, web based interface.

In an embodiment, the system 100 includes pack constructor and optimizer module 122 which enables the consumer as well as operator to optimize the packs and/or create new packs which can be based on user preferences may be in a particular geography.

In an embodiment, the system 100 includes billing and payment module 128 for managing the billing and complaint processing module to manage the complaints 136.

In an embodiment, the system 100 includes a plurality of databases wherein the databases include but are not limited to: EPG database, User Database, analytics database, transactions data, complaint redress database, PLM database etc.

In an embodiment, the system 100 includes payment gateways 142, operator subscriber management system module 124, call centre operation support module 130, outbound communication module 132, third party advertisers and advertise engine module 134 etc.

In an embodiment, the system 100 includes a communication module 140. The communication module 140 is configured to manage communications of the TC system 108 over the cloud computing platform 106 to interact with the plurality of the user terminals 102A-D.

The embodiments as described herein is compatible with all connected devices, dynamic in nature, the parameters of inputs can be changed as per the changing behaviours and attain ability to help a consumer understand and manage their day-to-day television consumption.

In one embodiment, the plurality of user terminals 102 are configured to perform the step of providing interface for user interaction for the user registration and login. The user management system module 112 is configured to perform the steps of identifying the registered user, the step of user authentication & authorization of the user, the step of user registration for the new user, and providing access to the user account of the respective user.

Figure 3:
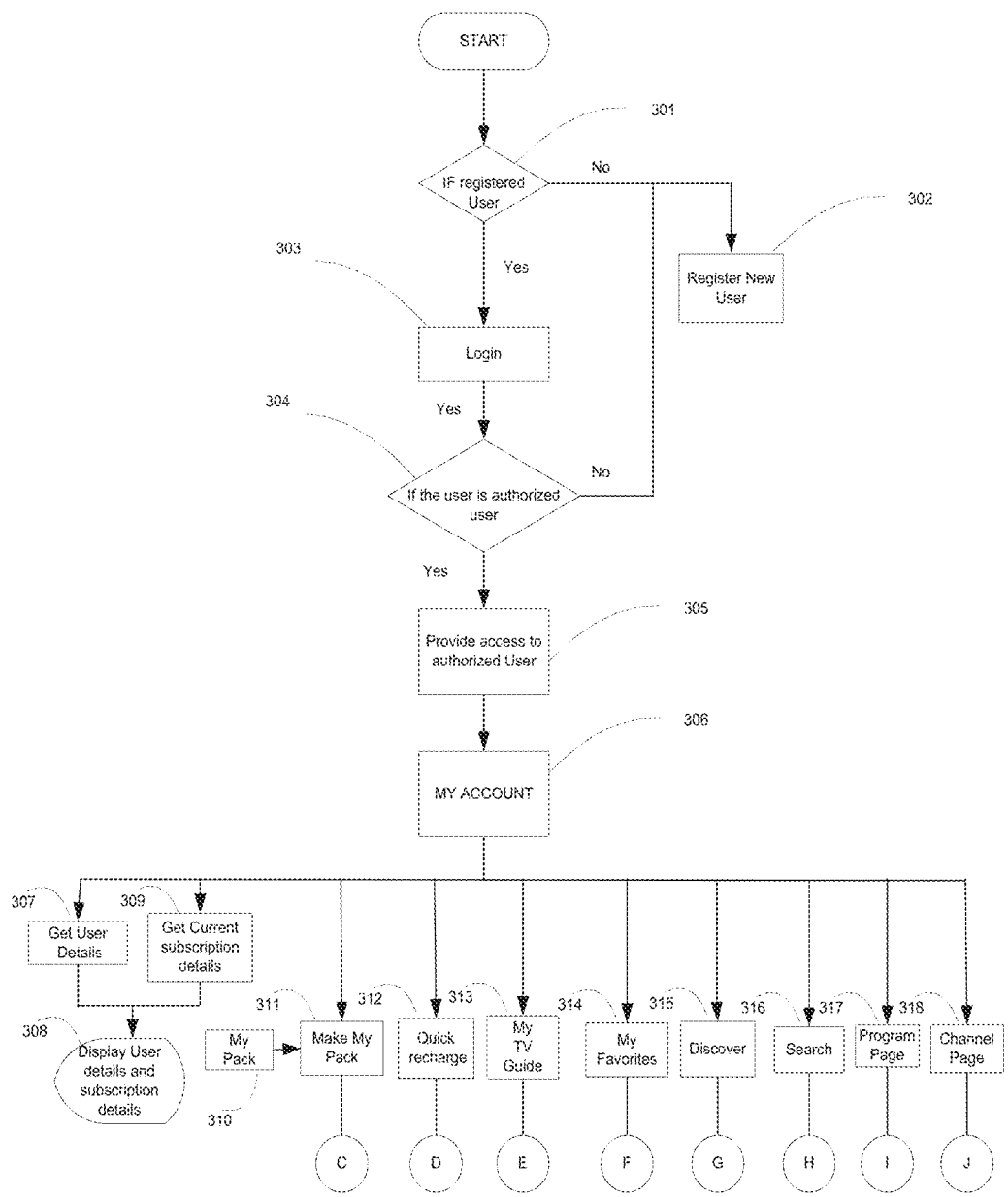
FIG. 3 describes an example process of providing a user access to their respective accounts and to the various actions performed to configure the pack and maintain the account.

FIG. 3 describe the process of providing access to the user to their respective accounts and to the various actions performed to configure the pack and maintain the account. At step 301 the method identifies if the user is a registered user. If the user is not a registered user the user registration process is initiated at the step 302. In case the user is observed to be a registered user the user access control details are received at the step 303. The received access control details are authenticated at the step 304. If the user authentication fails the user is directed to register as new user and the user registration process is initiated at the step 302. In case the user authentication is successful, the account access rights are authorized at the step 305. At step 306 the user is provided with the "My Account" process interface. The interface at step 307 provides process for obtaining the user details, at step 309 provides process to obtain current subscription details, at execution of step 308 the user details, account balance, current subscription Pack and Price, current subscription end date, Next renewal date are displayed. At step 310 the "My pack" details are extracted and made available for further processing. The Pack constructor and optimizer module 122 is configured to perform the steps 311 through 318. At the execution of the step 311, the user is allowed to make, customize and configure his channel/program pack. At step 312 the user is provided with a process for quick recharge of his pack. The execution of step 313 provides the user "My TV Guide" wherein the channel numbers and schedule grid based on his Pack is made available to the user. At the step 314 the user is provided with the process for managing his favourites. The step 315 provides a process for discovering unknown packs, channels, recommendations, etc. The step 316 provide a process for discovering unknown packs/channels, recommendations, top channels/Packs etc. The execution of step 317 provides the user the "program page" wherein the user is allowed to view, customize and subscribe the program. The execution of step 318 provides the user the "program page" wherein the user is allowed to view, analyse, customize and subscribe the program.

Figure 4:
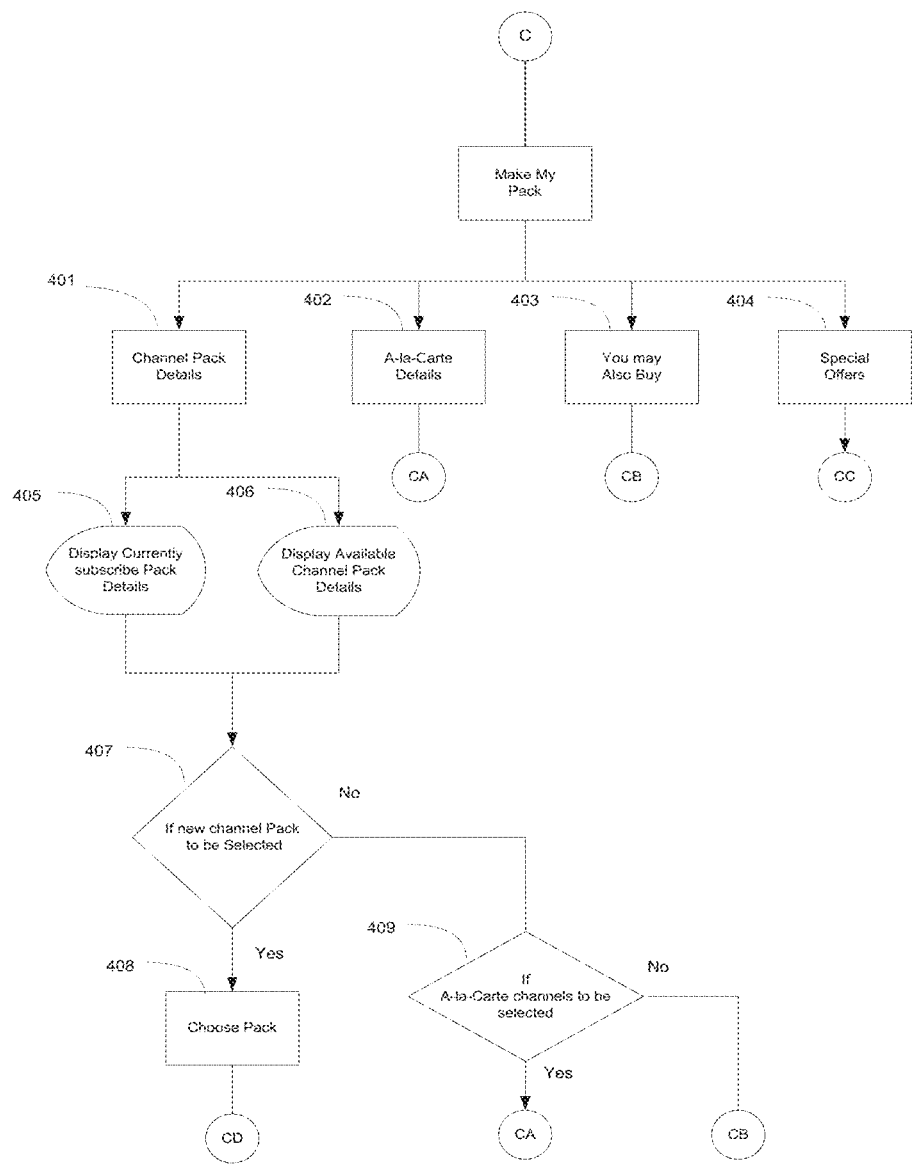
FIG. 4 details a process to make customize and configure channel/program pack as per user choice.

FIG. 4 details a process to make, customize and configure channel/program pack as per user choice. The process on execution extracts the channel pack details 401 including the currently subscribed pack details from the user account and the available channel packs from the EPG database and PLM database, display the currently subscribe pack details 405 and available channel pack details 406. The user is prompted to check if he wants to select new pack 407. If the user decides to select new pack, the new pack is selected from the available channel packs 408. In case the user decides not to select the new pack, the user is prompted to check if he wants to select any of the A-la-Carte channels 409. If the user decides to select any of the A-la-Carte channels, the process directs the user to the A-la-Carte channels details and selection step. In case the user decides not to select any of the A-la-Carte channels, the process directs the user to the system recommendations wherein the recommendation module 116 of the system provides recommendation based on the user profiling that is extracted from the operator subscriber management system module 124

Figure 5:
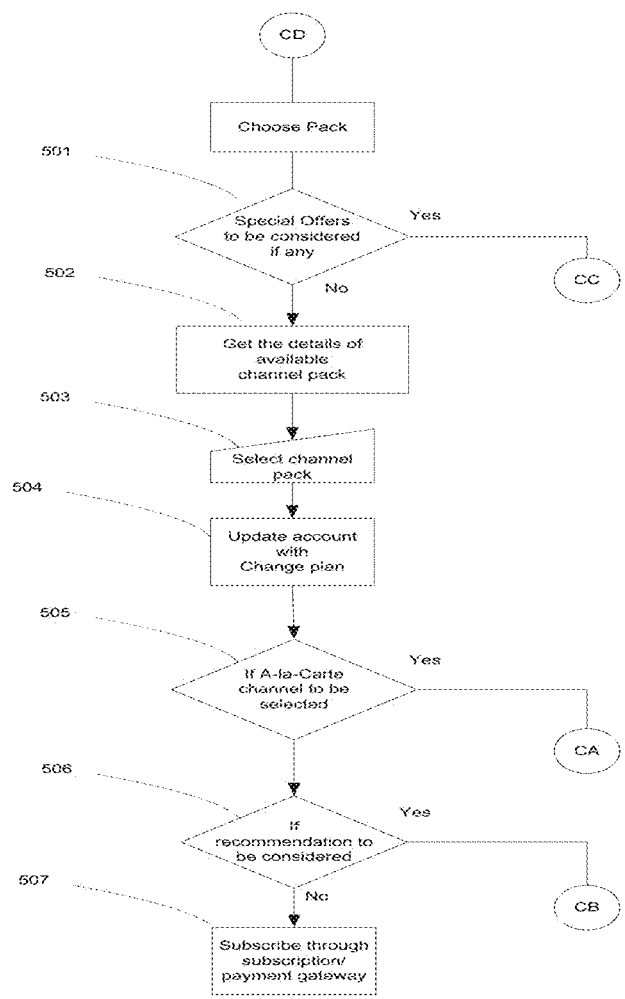
FIG. 5 describes the process to select a new pack.

FIG. 5 describes the process to select new pack, as a first step of the process the user is prompted to check if he want to consider any of the special offers for the channel pack 501. If the user decides to avail special offer, the process directs the user to the step of selecting special offer of channel packs. In case the user decides not to avail special offer, the details of the available channel packs are extracted 502 from the EPG database and PLM database. At step 503 it requires the user to select the channel pack from the available packs. The account is user updated 504 with the changed plan according to the selected channel pack and then it is required to decide by the user if A-la-Carte channels to be selected or not 505. If the user decides to select A-la-Carte channels to add to his channel pack the process is directed to the step of selecting A-la-Carte channels. In case the user decides not to select any A-la-Carte channels, then it is required by the user to decide if any recommendation is to be considered 506. If the user decides to select channels from recommendations to add to his channel pack the process is directed to the step of selecting channels from recommendations. In case the user decides not to select any channels from recommendations, the process is directed to subscribe the selection through subscription/payment gateway 507

Figure 6:
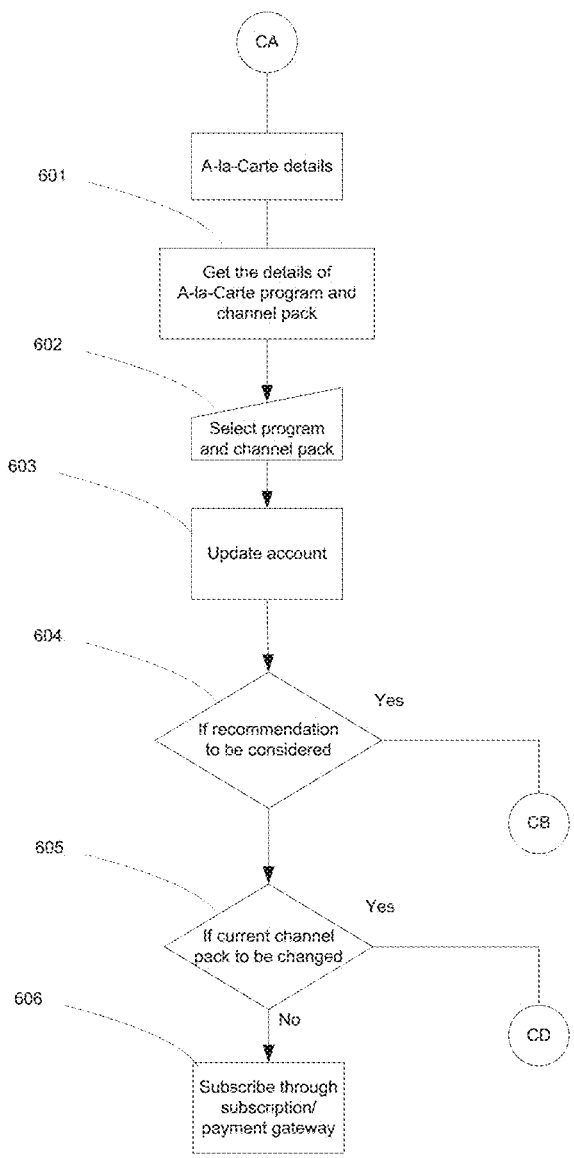
FIG. 6 describes the process to select channels from A-la-Carte channels.

FIG. 6 describes the process to select channels from A-la-Carte channels. As a first step of the process the details of the available A-la-Carte channels are extracted 601 from the EPG database and PLM database. At step 602 it requires the user to select the channel, programs or A-la-Carte pack from the available A-la-Carte channels and packs. The account is updated 603 with the changed plan according to the selected A-la-Carte channels/pack and then it is required to decide by the user if any recommendation is to be considered 604. If the user decides to select channels from recommendations to add to his channel pack the process is directed to the step of selecting channels from recommendations. In case the user decides not to select any channels from recommendations, then it is required by the user to decide if any change of current channel pack is to be considered 605. If the user decides to change current channel pack the process is directed to the step of selecting new channel pack. In case the user decides not to change current channel pack, the process is directed to subscribe the selection through subscription/payment gateway 606.

Figure 7:
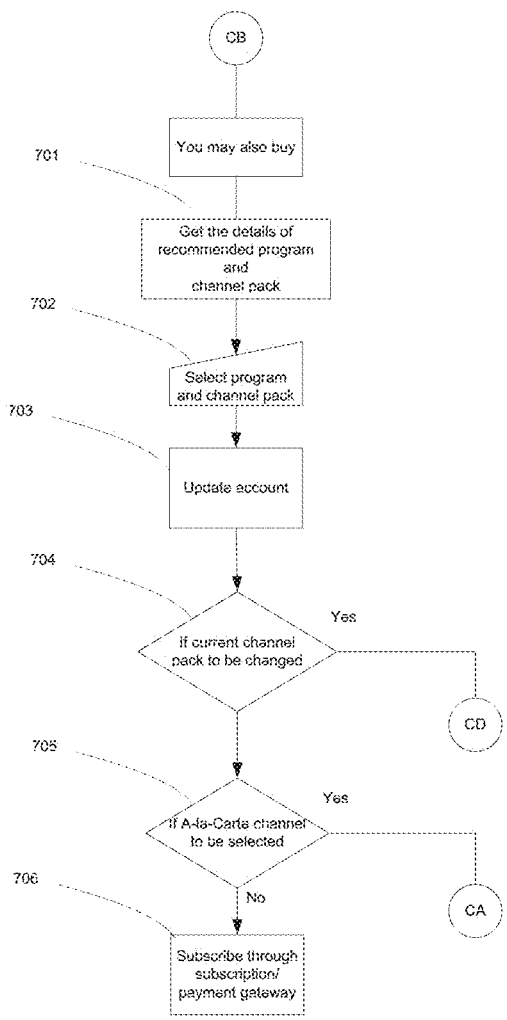
FIG. 7 describes the process to select programs and channels from recommendations.

FIG. 7 describes the process to select programs and channels from recommendations. As a first step of the process the details of the available recommendations of program and channels are extracted 701 from the recommendation module of and EPG database and PLM database. At step 702 it requires the user to select the channel, programs from the available recommended programs, channels and packs. The account is updated 703 with the changed plan according to the selected recommended program, channels/pack and then it is required to decide by the user if any change in the current channel Pack is to be considered 704. If the user decides to select new channel pack the process is directed to the step of selecting new channel pack. In case the user decides not to change current channel pack, then it is required by the user to decide if any A-la-Carte channels/programs to be considered for selection 705. If the user decides to select any A-la-Carte channels/programs the process is directed to the step of selecting A-la-Carte channels. In case the user decides not to select any A-la-Carte channels/programs, the process is directed to subscribe the selection through subscription/payment gateway 706.

Figure 8:
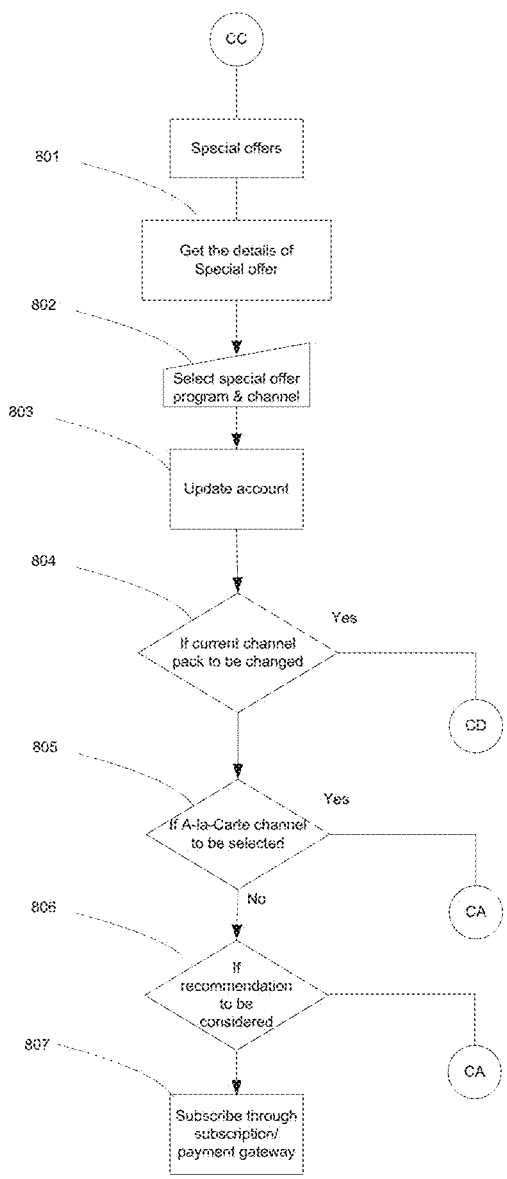
FIG. 8 describes the process to select programs and channels from special offers.

FIG. 8 describes the process to select programs and channels from special offers. As a first step of the process the details of the available special offers of program and channels packs are extracted 801 from the EPG database and PLM database. At step 802 it requires the user to select the channel, programs from the available special offers of program and channels packs. The account is updated 803 with the changed plan according to the selected special offers of program and channels packs and then it is required to decide by the user if any change in the current channel Pack is to be considered 804. If the user decides to select new channel pack the process is directed to the step of selecting new channel pack. In case the user decides not to change current channel pack, then it is required by the user to decide if any A-la-Carte channels/programs to be considered for selection 805. If the user decides to select any A-la-Carte channels/programs the process is directed to the step of selecting A-la-Carte channels. In case the user decides not to select any A-la-Carte channels/programs, then it is required by the user to decide if any recommendation is to be considered 806. If the user decides to select channels from recommendations to add to his channel pack the process is directed to the step of selecting channels from recommendations. In case the user decides not to select any channels from recommendations, then the process is directed to subscribe the selection through subscription/payment gateway 807.

Figure 9:
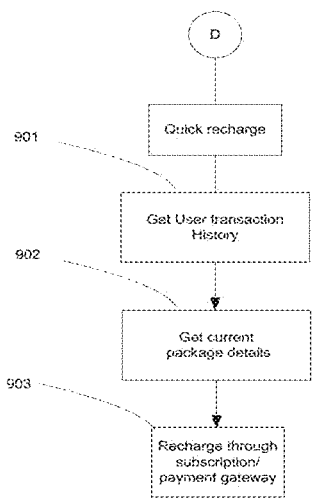
FIG. 9 describes the process to perform a quick recharge.

FIG. 9 describes the process to perform a quick recharge. As a first step of the process the details of the user transaction history are extracted 901 from the User database, EPG database and PLM database. The step 902 of the process when executed extracts the currently subscribed pack details from the user account and the available channel packs from the EPG database and PLM database. At Step 903 the process is directed to recharge the currently subscribed pack through subscription/payment gateway 142. The quick recharge process may involve, for example, identifying any content in the currently subscribed pack (obtained in step 902) that were not already paid for in accordance with the transaction history (obtained in step 901), and then submitting a request to the payment gateway 142 to charge a balance to the users payment method (in step 903).

Figure 10:
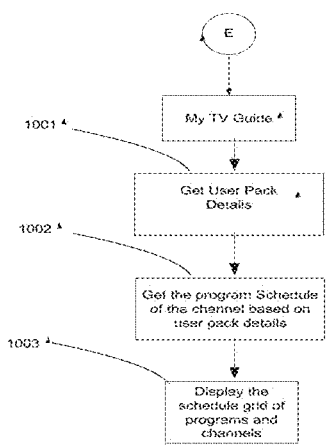
FIG. 10 describes the process to present "My TV Guide" to the user respective to his subscription.

FIG. 10 describes the process to present "My TV Guide" to the user respective to his subscription. As a first step of the process the details of the user subscriptions are extracted 1001 from the User Account, User database, EPG database and PLM database. At the step 1002, the process obtains program schedule of the channels based on user subscription pack details. At step 1003, the process displays the schedule grid of programs and channels.

Figure 11:
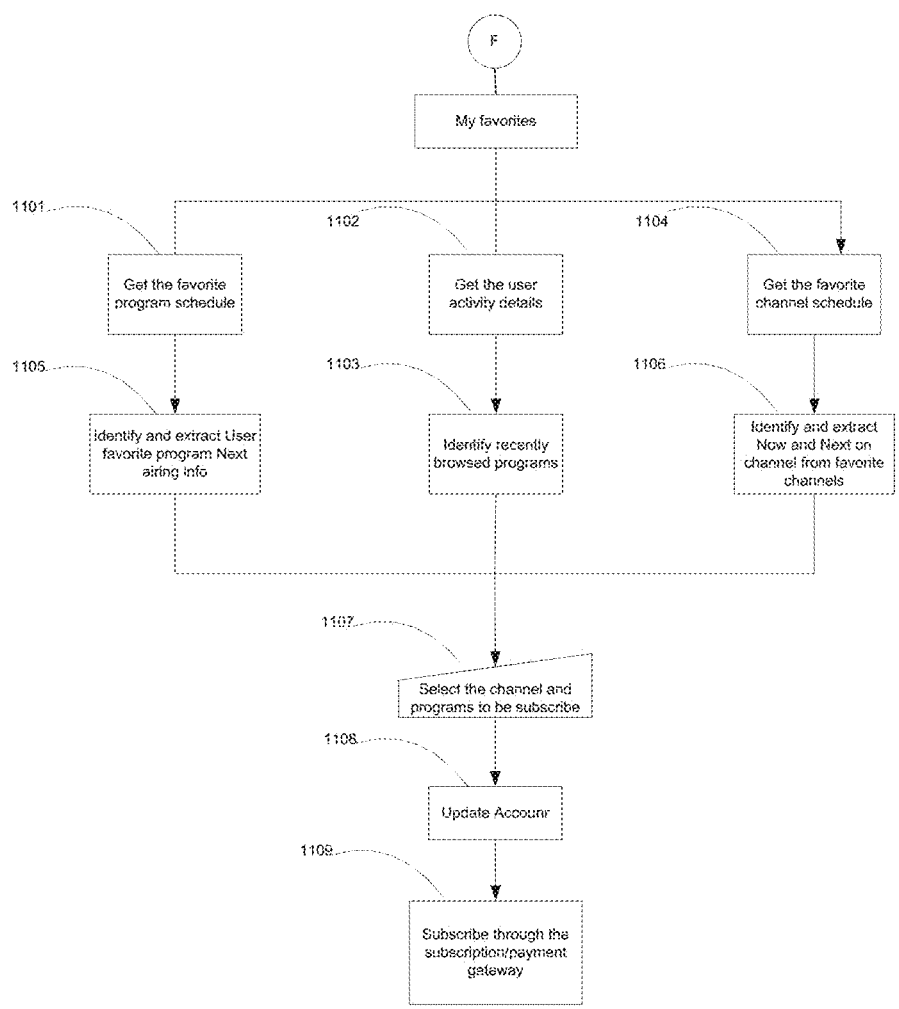
FIG. 11 describes the process to select programs and channels from favourites.

FIG. 11 describes the process to select programs and channels from favourites. As a first step of the process get the favourite program schedule 1101 from EPG database and PLM database for the favourites of the user based on the user profile at the user database. At the step 1102 the process is directed to get the details of the user activity from the User database. At the step 1103 the process is directed to identify recently browsed programs by the user. At step 1104, the process identify and extract the user favourite channels next airing info from the EPG database and PLM database based on information extracted in previous steps of the process. At step 1105, the process identify and extract the user favourite programs next airing info from the EPG database and PLM database based on information extracted in previous steps of the process. At step 1106 the user selects the channel and program to be subscribed and updates the account 1107 with the same. The process is directed to subscribe the selection through subscription/payment gateway 1108.

Figure 12:
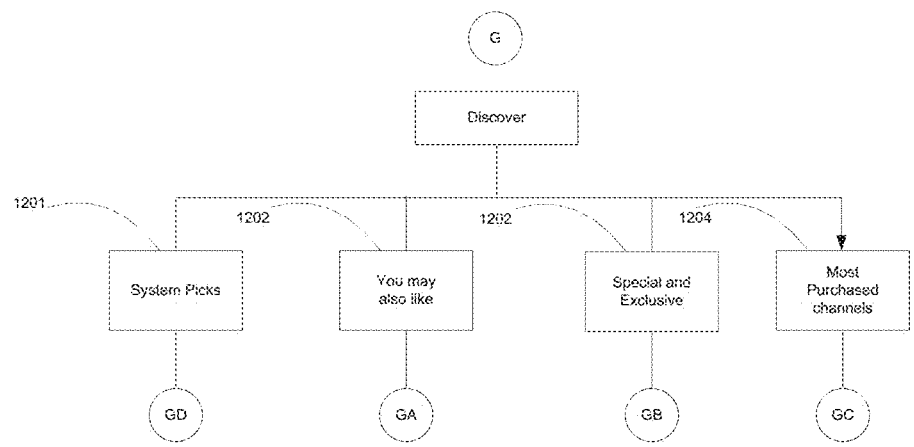
FIG. 12 describes the process to discover programs and channels from system picks, recommendations, from special and exclusive programs and most purchased channels.

FIG. 12 describes the process to discover programs and channels from system picks, recommendations, from special and exclusive programs and most purchased channels.

Figure 13:
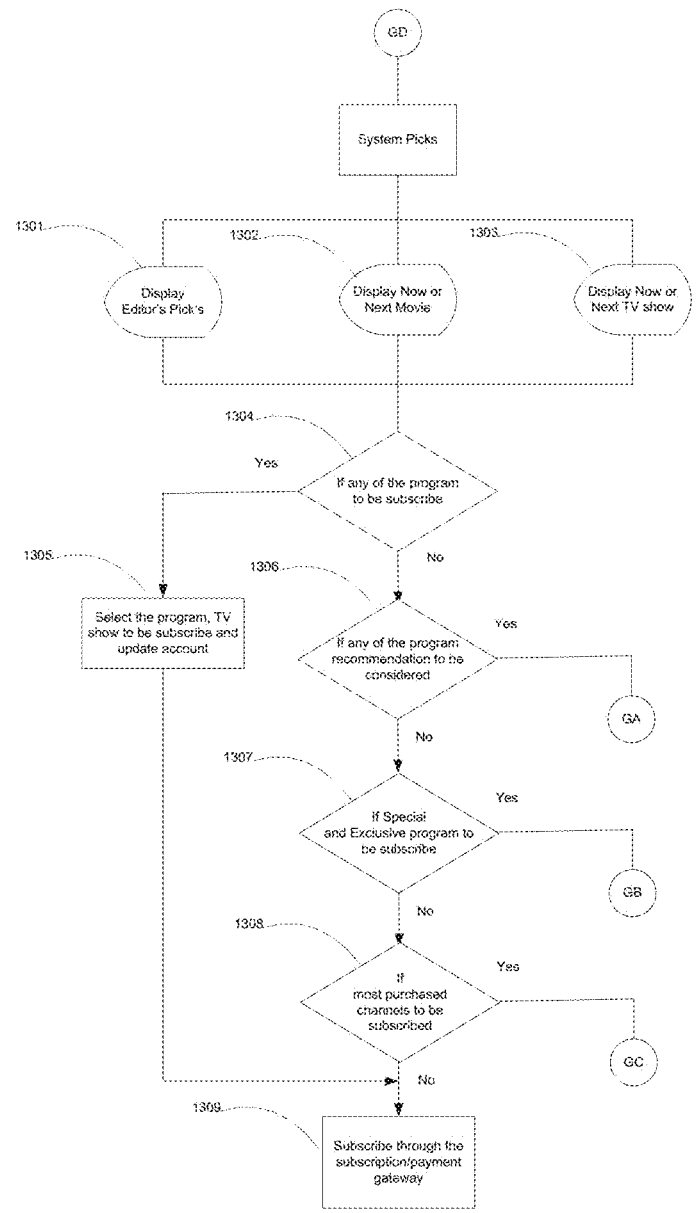
FIG. 13 describes the process to discover programs and channels from system picks.

FIG. 13 describes the process to discover programs and channels from system picks. As a first step of the process the pack construction and execution module extracts and displays the programs and channels which are Editors pick 1301. The module extracts and displays now or next movies 1302 from the EPG database. The module extracts and displays now or next TV shows 1303 from the EPG database. At step 1304 of the process the user is prompted to check if he wants to subscribe any of the programs from Editor's pick. If the user decides to subscribe any of the programs from Editor's pick, the process directs the user to the step of selecting any of the programs from Editor's pick 1305. In case the user decides not to subscribe any of the programs from Editor's pick, then it is required to decide by the user if any of the program recommendations is to be considered 1306. If the user decides to select any of the program recommendations the process is directed to the step of selecting any of the program recommendations. In case the user decides not to any of the program recommendations, then it is required by the user to decide if any special and exclusive program is to be considered for subscription 1307. If the user decides to select any special and exclusive program the process is directed to the step of selecting any special and exclusive program. In case the user decides not to select any special and exclusive program, then it is required by the user to decide if any most purchased channels to be subscribed 1308. If the user decides to select channels from any most purchased channels to add to his channel pack the process is directed to the step of selecting any most purchased channels from most purchased channels. In case the user decides not to select any channels from any most purchased channels, then the process is directed to subscribe the selection through subscription/payment gateway 1309.

Figure 14:
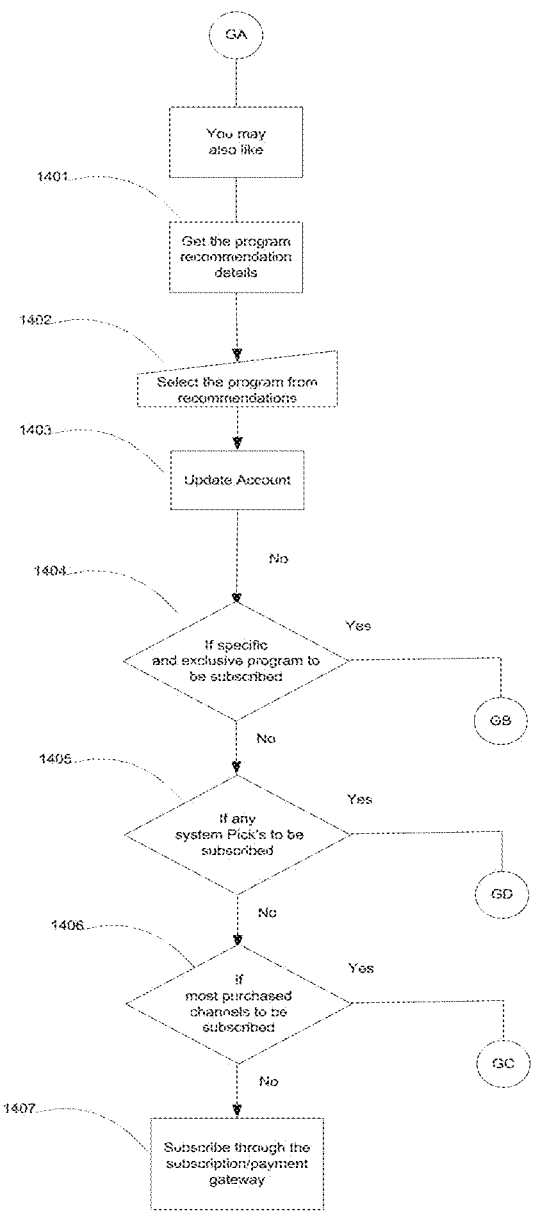
FIG. 14 describes the process to discover programs and channels from recommendations.

FIG. 14 describes the process to discover programs and channels from recommendations. As a first step of the process the details of the available recommendations of program and channels are extracted 1401 from the recommendation module and EPG database and PLM database. At step 1402 it requires the user to select the channel, programs from the available recommended programs, channels and packs. The account is updated 1403 with the changed plan according to the selected recommended program, channels/pack and then it is required by the user to decide if any special and exclusive program is to be considered for subscription 1404. If the user decides to select any special and exclusive program the process is directed to the step of selecting any special and exclusive program. In case the user decides not to select any special and exclusive program, then it is required by the user to decide if any Editor's system picks channels to be subscribed 1405. If the user decides to select channels from any Editor's system picks channels to add to his channel pack the process is directed to the step of selecting any Editor's picks channels from any Editor's system picks channels. In case the user decides not to select any channels from any Editor's system picks channels, then it is required by the user to decide if any most purchased channels to be subscribed 1406. If the user decides to select channels from any most purchased channels to add to his channel pack the process is directed to the step of selecting any most purchased channels from most purchased channels. In case the user decides not to select any channels from any most purchased channels, then the process is directed to subscribe the selection through subscription/payment gateway 1407.

Figure 15:
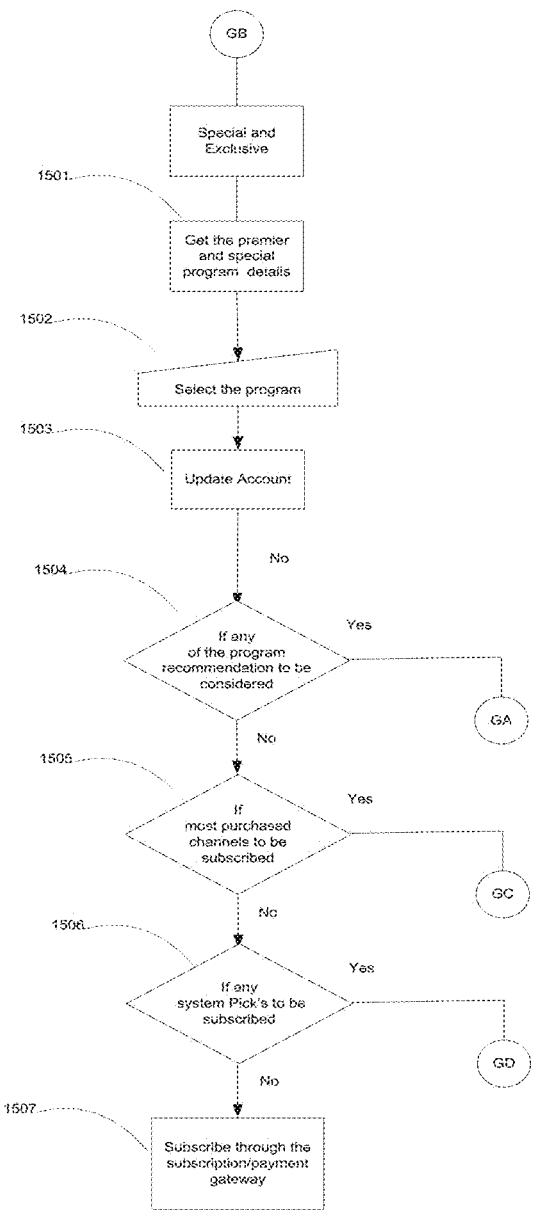
FIG. 15 describes the process to discover programs and channels from special and exclusive programs.

FIG. 15 describes the process to discover programs and channels from special and exclusive programs. As a first step of the process the details of the available special and exclusive programs and channels are extracted 1501 from the EPG database and PLM database. At step 1502 it requires the user to select the channel, programs from the available special and exclusive programs and channels and packs. The account is updated 1503 with the changed plan according to the selected special and exclusive programs and channels and packs and then it is required by the user to decide if any program recommendations is to be considered for subscription 1504. If the user decides to select any program recommendations the process is directed to the step of selecting any program recommendations. In case the user decides not to select any program recommendations, then it is required by the user to decide if any most purchased channels to be subscribed 1505. If the user decides to select channels from any most purchased channels to add to his channel pack the process is directed to the step of selecting any most purchased channels from most purchased channels. In case the user decides not to select any channels from any most purchased channels, then it is required by the user to decide if any Editor's system picks channels to be subscribed 1506. If the user decides to select channels from any Editor's system picks channels to add to his channel pack the process is directed to the step of selecting any Editor's picks channels from any Editor's system picks channels. In case the user decides not to select any channels from any Editor's system picks channels, then the process is directed to subscribe the selection through subscription/payment gateway 1507.

Figure 16:
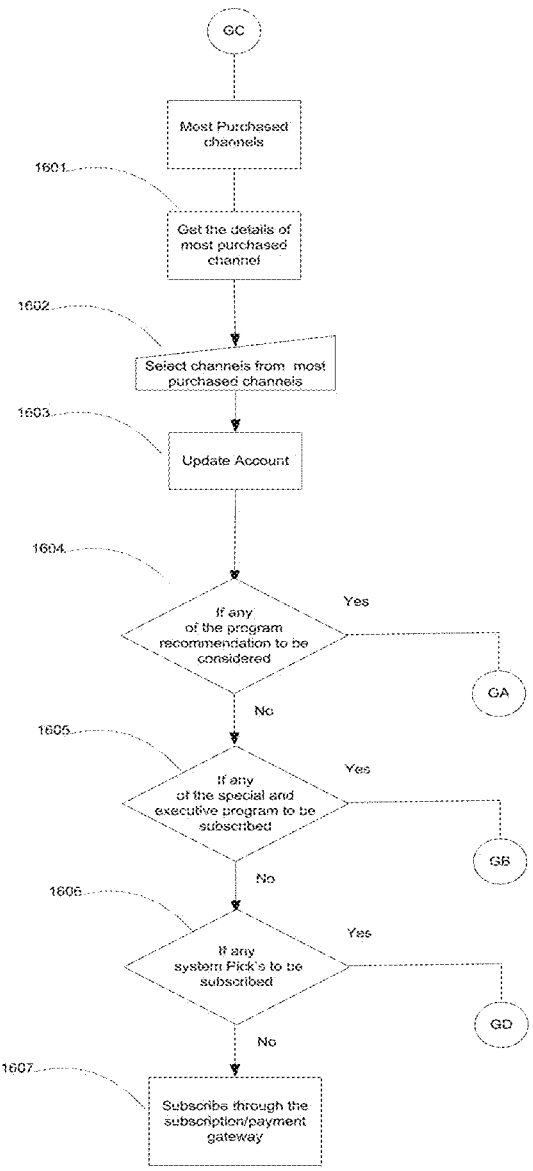
FIG. 16 describes the process to discover programs and channels from most purchased channels.

FIG. 16 describes the process to discover programs and channels from most purchased channels. As a first step of the process the details of the available most purchased channels are extracted 1601 from the EPG database and PLM database. At step 1602 it requires the user to select the channel, programs from the available most purchased channels and packs. The account is updated 1603 with the changed plan according to the selected most purchased channels and packs and then it is required by the user to decide if any program recommendations is to be considered for subscription 1604. If the user decides to select any program recommendations the process is directed to the step of selecting any program recommendations. In case the user decides not to select any program recommendations, then it is required by the user to decide if any special and exclusive programs or channels to be subscribed 1605. If the user decides to select channels from any special and exclusive programs or channels to add to his channel pack the process is directed to the step of selecting any special and exclusive programs or channels from available any special and exclusive programs or channels. In case the user decides not to select any special and exclusive programs or channels, then it is required by the user to decide if any Editor's system picks channels to be subscribed 1606. If the user decides to select channels from any Editor's system picks channels to add to his channel pack the process is directed to the step of selecting any Editor's picks channels from any Editor's system picks channels. In case the user decides not to select any channels from any Editor's system picks channels, then the process is directed to subscribe the selection through subscription/payment gateway 1607.

Figure 17:
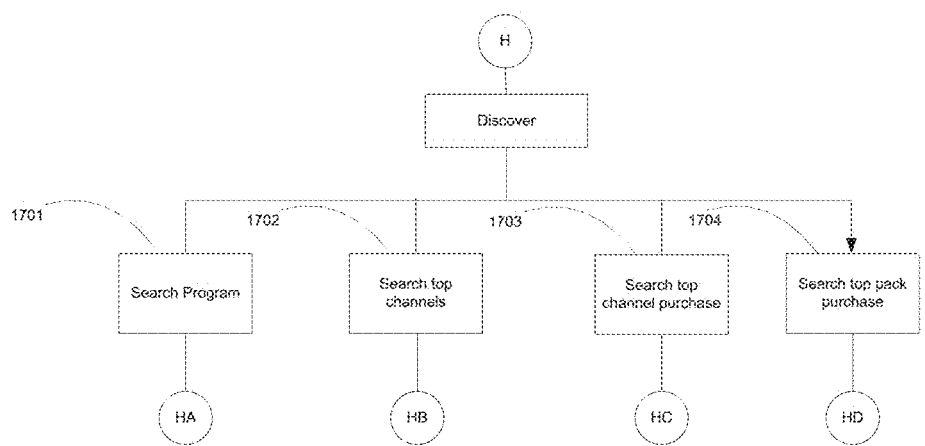
FIG. 17 describes the process to search the database programs and channels from plurality of databases and operator subscriber management system to obtain program based search results, top channels, top channels purchased and top packs.

FIG. 17 describes the process to search the database programs and channels from plurality of databases and operator subscriber management system to obtain program based search results, top channels, top channels purchased and top packs.

Figure 18:
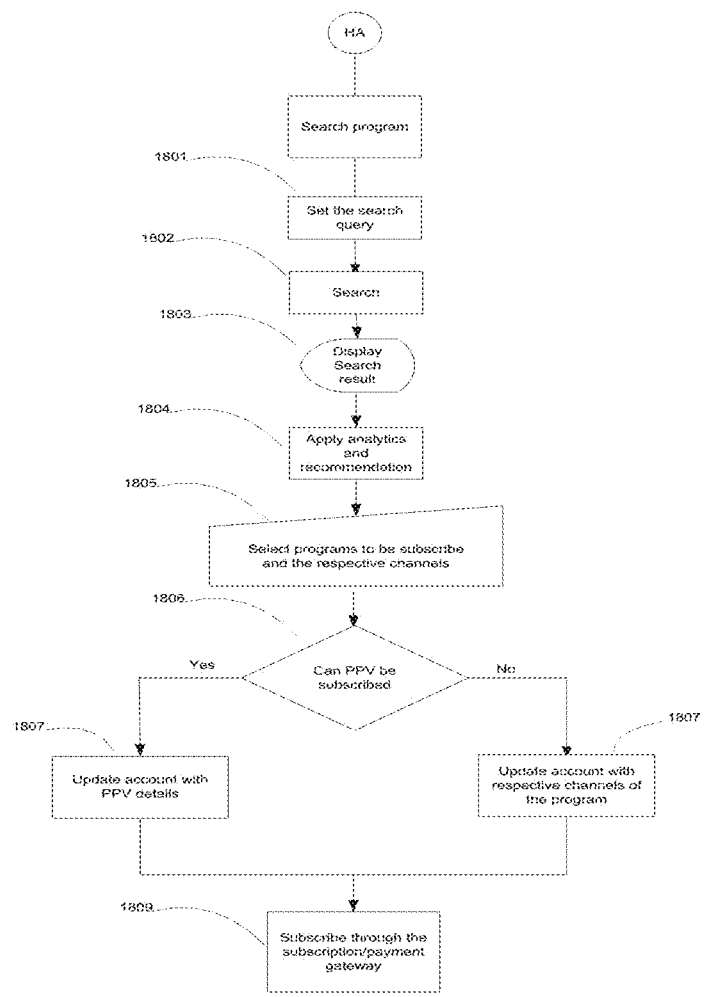
FIG. 18 describes the process to search the database programs and channels from plurality of databases and operator subscriber management system to obtain program based search results.

FIG. 18 describes the process to search the database programs and channels from plurality of databases and operator subscriber management system to obtain program based search results. As a first step of the process the search query is set by entering keyword along with specifying type of the key word and type of the program 1801. At the step 1802 the search is performed for the program through plurality of databases and operator subscriber management system. The results are displayed 1803. At the step 1804 the analytics and recommendation based on input from analytic database and recommendation database are applied to search result. The programs to be subscribe and their respective channels to be subscribed are selected 1805 from the resultant of step 1804. At step 1806 it is required by the user to decide if any PPV is to be considered for subscription. If the user decides to select any PPV the process is directed to update the account by selected program and respective channel to be subscribed along with PPV 1807. In case the user decides not to select any PPV then the process is directed to update the account by selected program and respective channel to be subscribed without any PPV 1808, and subscribe the selection through subscription/payment gateway 1809.

Figure 19:
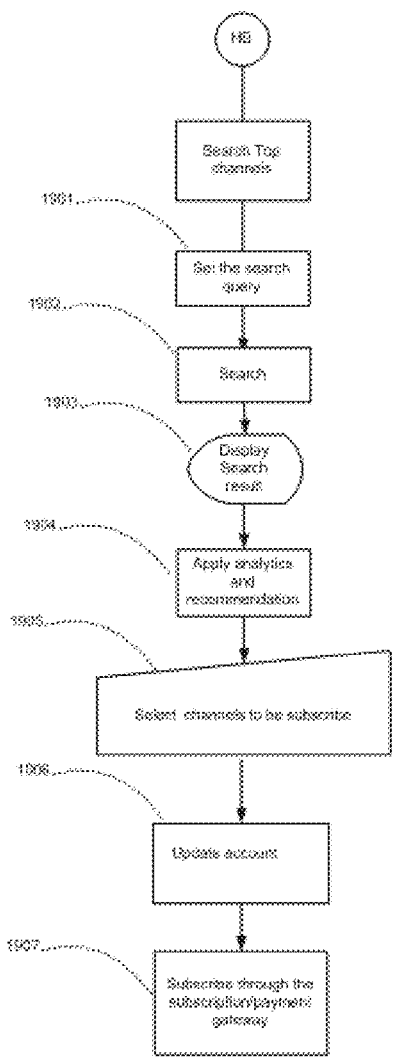
FIG. 19 describes the process to search the database programs and channels from plurality of databases and operator subscriber management system to obtain top channels.

FIG. 19 describes the process to search the database programs and channels from plurality of databases and operator subscriber management system to obtain top channels. As a first step of the process the search query is set by entering keyword along with specifying options such as but not limited to viewer-ship, genre, language etc. 1901. At the step 1902 the search is performed for the program through plurality of databases and operator subscriber management system. The results are displayed 1903. At the step 1904 the analytics and recommendation based on input from analytic database and recommendation database are applied to search result. The programs to be subscribe and their respective channels to be subscribed are selected 1905 from the resultant of step 1904. Then the process is directed to update the account by selected program and respective channel to be subscribed 1906, and subscribe the selection through subscription/payment gateway 1907.

Figure 20:
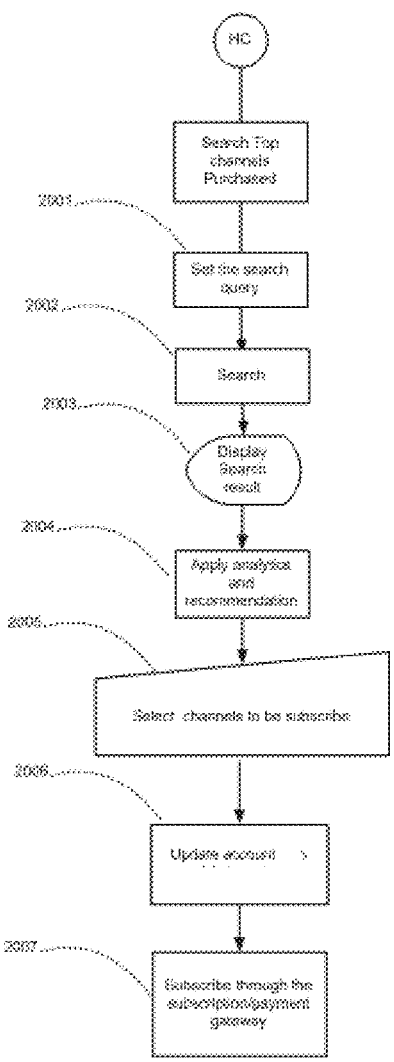
FIG. 20 describes the process to search the database programs and channels from plurality of databases and operator subscriber management system to obtain top channels purchased.

FIG. 20 describes the process to search the database programs and channels from plurality of databases and operator subscriber management system to obtain top channels purchased. As a first step of the process the search query is set by entering keyword along with specifying options such as but not limited to viewer-ship, genre, language etc. 2001. At the step 2002 the search is performed for the program through plurality of databases and operator subscriber management system. The results are displayed 2003. At the step 2004 the analytics and recommendation based on input from analytic database and recommendation database are applied to search result. The programs to be subscribe and their respective channels to be subscribed are selected 2005 from the resultant of step 2004. Then the process is directed to update the account by selected program and respective channel to be subscribed 2006, and subscribe the selection through subscription/payment gateway 2007

Figure 21:
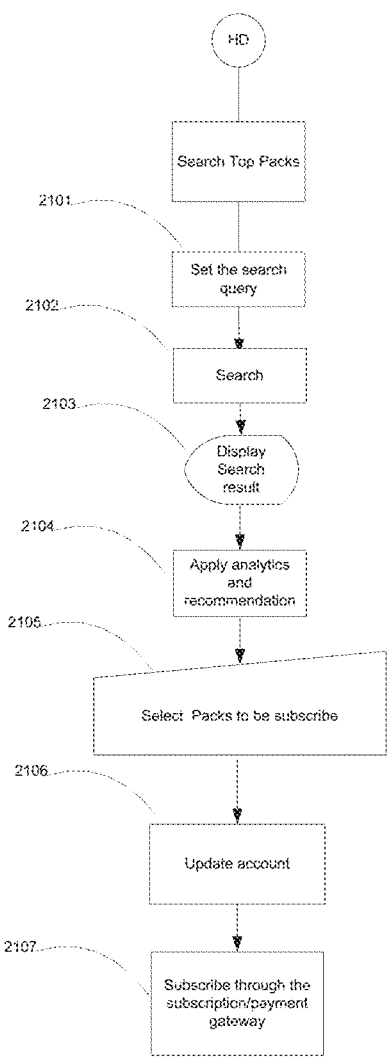
FIG. 21 describes the process to search the database programs and channels from plurality of databases and operator subscriber management system to obtain top packs.

FIG. 21 describes the process to search the database programs and channels from plurality of databases and operator subscriber management system to obtain top packs. As a first step of the process the search query is set by entering keyword along with specifying options such as but not limited to viewer-ship, genre, language etc. 2101. At the step 2102 the search is performed for the program through plurality of databases and operator subscriber management system. The results are displayed 2103. At the step 2104 the analytics and recommendation based on input from analytic database and recommendation database are applied to search result. The programs to be subscribe and their respective channels to be subscribed are selected 2105 from the resultant of step 2104. Then the process is directed to update the account by selected program and respective channel to be subscribed 2106, and subscribe the selection through subscription/payment gateway 2107.

Figure 22:
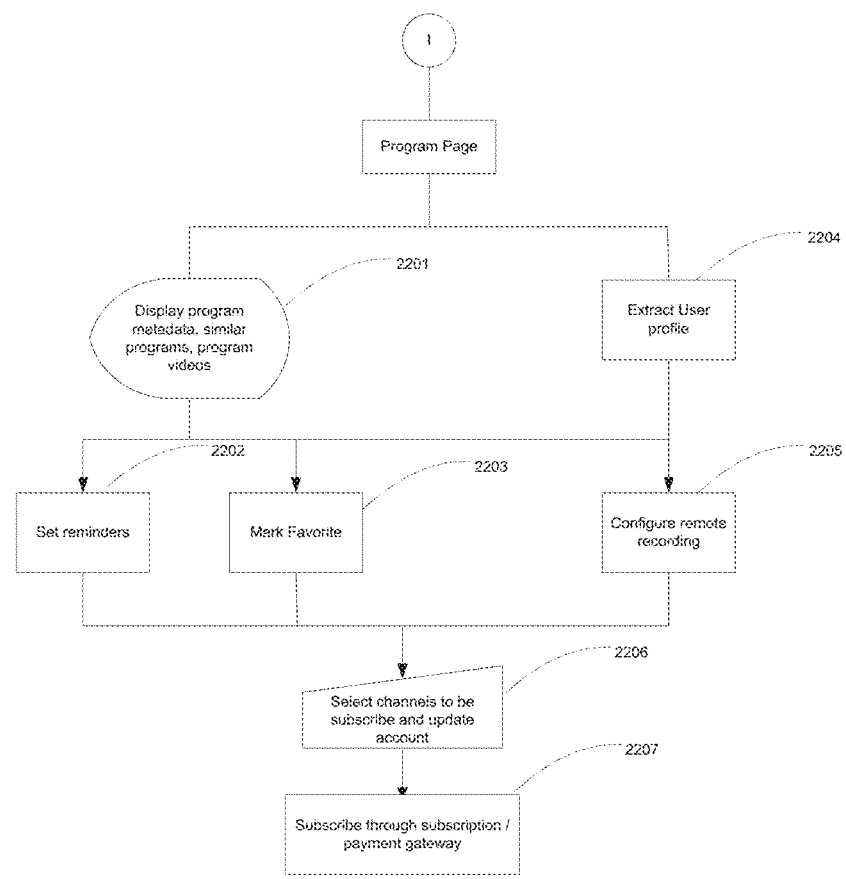
FIG. 22 describes the process to subscribe a program from the program page interface.

FIG. 22 describes the process to subscribe a program from the program page interface. As a first step program metadata, similar programs and program videos are displayed 2201. At step 2202 the program reminders are set for the selected program. At step 2203 the program favourites are marked for the selected program. At step 2204 the user profile is extracted from the user account and user database. At step 2205 the remote recordings are configured set for the selected programs. Program reminders are set for the selected program. Then the process is directed to update the account by selected program and respective channel to be subscribed 2206, and subscribe the selection through subscription/payment gateway 2207.

Figure 23:
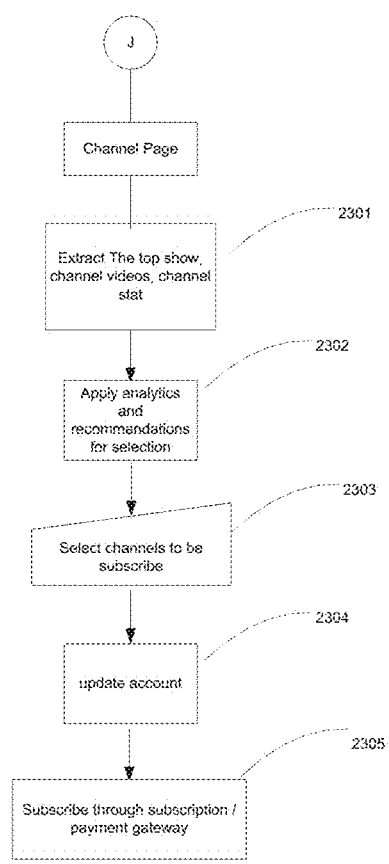
FIG. 23 describes the process to subscribe a channel from the channel page interface.

FIG. 23 describes the process to subscribe a channel from the channel page interface. As a first step, the top show, channel videos and channel stats are extracted from the EPG and PLM database and operator subscription management system. 2301. At the step 2302 the analytics and recommendation based on input from analytic database and recommendation database are applied to the resultant of step 2301. The channels to be subscribed are selected 2303 from the resultant of step 2302. Then the process is directed to update the account by selected channel to be subscribed 2304, and subscribe the selection through subscription/payment gateway 2305.

A method and system for management of day-to-day television consumption is disclosed. More particularly, the present disclosure relates to seamless evaluation and comparison of operators and channel packages and management of the programs/channel packs offered by the operators as described above enables the consumer to view and compare offers, buy new connection, buy/upgrade packs/channels in the pack, recharge account, view pack/channel comparison, construct packs, register and track complaints etc. The system as describe above also enable consumer to perform Quick Recharge, where consumer may be able to recharge their user accounts with DTH/cable operator/service providers and all other advanced platform of media distribution with minimum efforts.

In some examples, the systems described herein, such as system 100, may include one or more processors, one or more forms of memory, one or more input devices/interfaces, one or more output devices/interfaces, and machine-readable instructions that when executed by the one or more processors cause the system to carry out the various operations, tasks, capabilities, etc., described above.

In some embodiments, the disclosed techniques can be implemented, at least in part, by computer program instructions encoded on a non-transitory computer-readable storage media in a machine-readable format, or on other non-transitory media or articles of manufacture. Such computing systems (and non-transitory computer-readable program instructions) can be configured according to at least some embodiments presented herein, including the processes shown and described in connection with FIGS. 1-23.

The programming instructions can be, for example, computer executable and/or logic implemented instructions. In some examples, a computing device is configured to provide various operations, functions, or actions in response to the programming instructions conveyed to the computing device by one or more of the computer readable medium, the computer recordable medium, and/or the communications medium. The non-transitory computer readable medium can also be distributed among multiple data storage elements, which could be remotely located from each other. The computing device that executes some or all of the stored instructions can be a microfabrication controller, or another computing platform. Alternatively, the computing device that executes some or all of the stored instructions could be remotely located computer system, such as a server.

Further, while one or more operations have been described as being performed by or otherwise related to certain modules, devices or entities (e.g., the TC device 108 or the PCCM 122), the operations may be performed by or otherwise related to any module, device or entity. As such, any function or operation that has been described as being performed by the device 108 could alternatively be performed by a different server, by the cloud computing platform 106, or a combination thereof. For instance, in one example, one server could generate and transmit a list of recommended content for a particular user based on one or more content and/or viewing attributes associated with that user, and based on the list of recommended content, another server or user-associated terminal, such as one of the terminals 102, could generate and display information associated with one or more items in the list of content for viewing by the particular user.

Further, the operations need not be performed in the disclosed order, although in some examples, an order may be preferred. Also, not all functions need to be performed to achieve the desired advantages of the disclosed system and method, and therefore not all functions are required.

While select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

The invention claimed is:

1. A system for an evaluation, customization, and management of programs and channel packs, the system comprising:
   a plurality of user terminals;
   at least one server connected to the plurality of user terminals;
   at least one network;
   at least one cloud computing platform connecting the at least one server over the at least one network;
   at least one television consumption (TC) device connected to the cloud computing platform to interact with the plurality of user terminals through the at least one server, wherein the TC device is configured to:
   perform a quick recharge;
   display a TV guide to a user based on a subscription of the user;
   select programs and channels from a list of favorites;
   discover programs and channels from a list of system picks, recommendations, from special and exclusive programs, and most purchased channels;
   search programs and channels from a plurality of databases and an operator subscriber management system to obtain program-based search results; and make, customize, and configure the channel pack based on user input, enabling the user to build a custom optimized pack, wherein building the custom optimized pack comprises:
  (i) allowing the user to add individual channels from an a-la-carte list and create a custom pack based on individual channel prices;
  (ii) aiding the user's channel selection by making use of the user's favorite channels, language, and genre preference;
  (iii) aiding the user by dynamically displaying a total price for the custom pack, wherein the total price changes with an addition or deletion of a channel to or from the custom pack;
  (iv) optimizing a list of required channels based on a dynamic selection of channels by the user;
  (v) comparing the list of required channels to one or more pre-defined channel packs and their channel compositions; and
  (vi) optimizing output results based on price to suggest a best buy to the user.

2. The system of claim 1, wherein the TC device further comprises a processor that executes:
  at least one user management system module configured to provide a user dashboard that is designed to address one or more of the user's TV-related needs;
  at least one database module comprising an electronic program guide (EPG) database, a preview database, a user database, an analytics database, a transaction database, a complaint redress database, and a pack and lineup management (PLM) database;
  at least one recommendation module configured to make personalized recommendations to the user based on a plurality of inputs from the user;
  at least one comparator module configured to perform a comparison of a plurality of channel packs and a plurality of channels offered by a plurality of operators;
  at least one derivative and output module configured to draw a plurality of derivatives and outputs taking into account a plurality of parameters;
  at least one operator subscriber management system module configured to store subscriber account details including an indication of one or more subscribed packs, an account balance, and an account status and access the account details in real time;
  at least one data acquisition module configured to acquire data dynamically from the plurality of operators and update and upgrade the plurality of databases of the system;
  at least one payment and billing module for managing billing;
  a call center operation support module;
  an outbound communication module;
  at least one third party advertiser engine module;
  a complaint processing module to manage complaints;
  a system process control module configured to initiate and synchronize execution of various modules of the system and further configured to make and configure one or more user-defined packs of channels and programs;
  a communication module configured to manage communications of the system with the plurality of the user terminals; and
  at least one pack constructor and optimizer module, wherein the pack constructor and optimizer module is configured to build one or more custom optimized channel packs.

3. The system of claim 1, wherein the system is configured to enable broadcasters to determine a number of subscribers per pack or channel.

4. The system of claim 1, further comprising a processor that executes a recommendation module configured to generate recommendations by tracking the user's transaction history from an operator subscriber management system module and from a user profile that includes the user's TV preferences and activities.

5. The system of claim 1, further comprising a processor that executes a comparator module configured to generate a comparison table that includes a number of the user's favorite channels within each channel pack and a number of fans for a particular channel.

6. The system of claim 1, further comprising a processor that executes an operator subscriber management system module configured to provide real time access to subscriber account details including an indication of one or more subscribed packs, an account balance, and an account status.

7. A method for an evaluation, customization, and management of programs and channel packs, the method comprising:
  identifying at least one registered user;
  authenticating and authorizing the at least one registered user;
  obtaining details from the at least one registered user;
  obtaining at least one current subscription detail of the at least one registered user;
  performing a quick recharge;
  displaying a TV guide to the user based on a subscription of the user;
  selecting programs and channels from a favorites list;
  discovering programs and channels from system picks, recommendations, from special and exclusive programs, and most purchased channels;
  searching programs and channels from a plurality of databases and an operator subscriber management system to obtain program-based search results; and
  making, customizing, and configuring a channel/program pack based on user input, enabling the user to build a custom optimized pack, wherein building a custom optimized pack comprises:
    (i) processing to make, customize, and configure the channel/program pack based on user input and updating a user account with the selected programs, channels, and packs;
    (ii) selecting programs and channels from the favorites list and updating the user account with the selected programs, channels, and packs;
    (iii) executing a discovery process to discover programs and channels from system picks, recommendations, from special and exclusive programs, and most purchased channels and updating the account with the selected programs, channels, and packs;
    (iv) executing a search process to search for programs and channels from a plurality of databases and the operator subscriber management system to obtain program-based search results, top channels, top channels purchased, and top packs and updating the user account with the selected programs, channels, and packs;
    (v) executing a process to subscribe to a program from a program page interface and updating the user account with the selected programs, channels, and packs;

(vi) aiding the user by dynamically displaying a total price for the custom pack, wherein the total price changes with an addition or deletion of a channel to or from the custom pack;

(vii) optimizing a list of required channels based on a dynamic selection of channels by the user;

(viii) comparing the list of required channels to one or more pre-defined packs and their channel compositions;

(ix) optimizing output results based on price to suggest a best buy to the user;

(x) updating the user account with one or more selected programs, channels, and packs; and (xi) subscribing to the selected programs, channels, and packs through a subscription gateway.

8. The method of claim 7, wherein the process to make, customize, and configure the channel/program pack based on user input and updating the user account with the selected programs, channels, and packs comprises:

selecting a new channel pack;

selecting one or more channels from a list of a-la-carte channels;

selecting one or more programs and channels from a list of recommendations;

selecting one or more programs and channels from a list of special offers; and updating the user account with the selected programs, channels, and packs.

9. The method of claim 7, wherein the process to discover programs and channels from system picks, recommendations, from special and exclusive programs, and most purchased channels and updating the user account with the selected programs, channels, and packs comprises:

discovering one or more programs and channels from a list of system picks;

discovering one or more programs and channels from a list of recommendations;

discovering one or more programs and channels from a list of special and exclusive programs;

discovering one or more programs and channels from a list of most purchased channels; and updating the user account with the selected programs, channels, and packs.

10. The method of claim 7, wherein executing the search process to search for programs and channels from a plurality of databases and the operator subscriber management system to obtain program-based search results, top channels, top channels purchased, and top packs and updating the account with the selected programs, channels, and packs comprises:

searching for programs and channels from the plurality of databases and the operator subscriber management system to obtain program-based search results;

searching for programs and channels from the plurality of databases and the operator subscriber management system to obtain a list of top channels;

searching for programs and channels from the plurality of databases and the operator subscriber management system to obtain a list of top channels purchased;

searching for programs and channels from the plurality of databases and the operator subscriber management system to obtain a list of top packs; and updating the user account with the selected programs, channels, and packs.

11. The method of claim 7, wherein the recommendations are generated based on the user's transaction history from an operator subscriber management system and a user profile that includes the user's TV preferences and activities.

12. The method of claim 7, wherein channels that are not subscribed to by the user are indicated by targeted recommendations based on one or more channels recently launched in the user's favorite genre, channels similar to the user's favorite channels, one or more favorite channels not included in the user's pack, and channels that air one or more of the user's favorite programs.

13. The method of claim 7, further comprising providing a comparison table by a comparator module, wherein the comparison table indicates a number of the user's favorite channels within a channel pack and a number of fans for a particular channel.

14. The method of claim 7, wherein real time access to subscriber account details including a list of one or more subscribed packs, an account balance, and an account status is provided by an operator subscriber management system module.

15. The method of claim 7, wherein derivatives and outputs including top shows and channel statistics are derived by a derivative and output module.

16. The method of claim 7, wherein one or more analytics are extracted from an analytics database.

17. The method of claim 7, wherein the data related to service offerings from an operator including one or more of a name of a pack, a price, schemes and offers, or a type of set-top-box used is associated with each program, channel, or pack that the operator offers and is stored, managed, and provided by a pack and lineup management (PLM) database.

* * * * *